United States Patent [19]
Goff

[11] Patent Number: 5,445,176
[45] Date of Patent: Aug. 29, 1995

[54] MOISTURE SENSITIVE IRRIGATION VALVE CONTROL

[76] Inventor: Milton L. Goff, 325 6th St., Ramona, Calif. 92065

[21] Appl. No.: 206,905

[22] Filed: Mar. 4, 1994

Related U.S. Application Data

[63] Continuation of Ser. No. 34,082, Mar. 22, 1993, abandoned.

[51] Int. Cl.$^6$ .............................................. F16K 17/38
[52] U.S. Cl. ...................... 137/80; 137/78.3; 239/64
[58] Field of Search ............... 239/64; 137/78.3, 80

[56] References Cited

U.S. PATENT DOCUMENTS

| | | | |
|---|---|---|---|
| 4,256,133 | 3/1981 | Coward et al. | 239/64 |
| 4,548,225 | 10/1985 | Busalacchi | 239/64 |
| 4,684,920 | 8/1987 | Reiter | 137/78.3 |
| 4,693,419 | 9/1987 | Weintraub et al. | 137/78.3 |
| 4,796,654 | 1/1989 | Simpson | 137/78.3 |
| 4,934,400 | 6/1990 | Cuming | 137/78.3 |
| 5,148,826 | 9/1992 | Bakhshaei | 137/78.3 |

Primary Examiner—A. Michael Chambers
Attorney, Agent, or Firm—Thomas J. Tighe

[57] ABSTRACT

A moisture control system which overrides power supplied to electrically operated irrigation control valves such that a preset amount of moisture content of soil is not exceeded. The system is composed of two components, a remote detector, which is disposed in soil distant from its controller, and a controller which is placed near the valve it controls or the valve's source of power.

The controller is electrically placed between the source of power for a valve, such as a time clock, or 24 VAC transformer and the valve. The controller receives its power from the source of power and the valve receives its power from the controller. The controller supplies electrically isolated power to the remote detector, sets the desired moisture level at the remote detector, and controls power to the valve.

The remote detector receives its operating power and desired moisture setting from the controller and the controller receives data as to whether the moisture is above or below the desired moisture from the remote detector via two connecting wires.

Attached to and part of the remote detector is a probe having electrical characteristics that change with respect to the moisture content of the soil. The remote detector contains probe signal conditioning and level detecting circuits normally placed in the controller. Locating moisture sensing and detector circuits in the remote detector allows the use of low power probes, and effectively eliminates problems associated with electrical noise, probe plating, and distance between the sensing device and the valve control electronics.

20 Claims, 4 Drawing Sheets

MOISTURE SENSITIVE IRRIGATION VALVE CONTROL

This is a continuation of application Ser. No. 08/034,082, filed on Mar. 22, 1993 now abandoned.

BACKGROUND OF THE INVENTION

1. Field of the Invention

This invention relates to the field of irrigation control devices. More particularly, it relates to a device that controls power applied to an electrically operated control valve as a function of soil moisture with the moisture sensing and detecting being physically remote from the level setting and valve control. It inhibits valve power when there is adequate moisture in the soil for which it controls irrigation and allows the power to be applied as long as irrigation is needed.

2. Description of the Prior Art

Field of Search
137/78.1, 78.3; 239/63: 324/690
Search References
U.S. Patent Documents
U.S. Pat. No. 4,838,296 Jun. 13, 1989 Brooks
U.S. Pat. No. 4,852,802 Aug. 1, 1989 Iggulden et al
U.S. Pat. No. 5,060,859 Oct. 29, 1991 Bancroft
U.S. Pat. No. 4,952,868 Aug. 28, 1990 Scherer, III
U.S. Pat. No. 4,684,920 Aug. 4, 1987 Reiter The prior art discloses circuits for controlling irrigation devices.

U.S. Pat. No. 4,838,296 discloses a system for controlling an electrically operated irrigation valve in response to input power from a clocking device and soil moisture conditions. It also discloses a varying resistance sensing element. Note, however, that the control uses AC power from a clocking device and that power is applied to the valve, control, and sensing device without isolation. Once it has applied power to a valve it will continue until input power is removed by the clocking device. The sensing and level detecting circuit is not remote from the level setting and valve control circuit. The sensing element uses a ceramic block and is powered by AC.

U.S. Pat. No. 4,852,802 discloses a system for controlling an electrically operated irrigation control valve in response to soil moisture conditions. Note however that the control and sensor circuits and the sensing element are not disclosed. The disclosed sensor and combined sensor and control receives its power from batteries. The combined sensor and control can not control a standard AC powered irrigation valve. The separate sensor and control communicate via radio frequency and the sensor moisture level can not be adjusted remotely.

U.S. Pat. No. 5,060,859 discloses a system for controlling an electrically operated irrigation valve in response to input power from a clocking device and soil moisture conditions. It also discloses varying resistance sensing elements. Note, however, that it does not disclose the sensing element. The control uses AC power from a clocking device and that power is applied to the valve, control, and sensing device without isolation. Once power is applied to a valve it is latched on and will continue until input power is removed by the clocking device. The sensing and level detecting circuit is not remote from the level setting and valve control circuit.

U.S. Pat. No. 4,952,868 discloses a varying resistance sensing element to be used in conjunction with an electrically operated irrigation valve control Note however that it does not control an irrigation valve as a function of moisture.

U.S. Pat. No. 4,684,920 discloses a remotely controlled bypass for a system for controlling an electrically operated irrigation valve in response to input power from a clocking device and soil moisture conditions. Note however that it does not control an irrigation valve as a function of moisture.

SUMMARY OF THE INVENTION

The invention discloses an improved control system for electrically operated irrigation valves that is easily retrofittable into existing irrigation systems. The invention is physically divided into two components, a sensor assembly and a control assembly, which are electrically connected via two wires. The sensor assembly is disposed the soil and contains the electronics necessary to condition the low level signal derived from its sensing device, and a level detector to determine when the conditioned signal indicates the soil moisture meets or exceeds the level selected at the control assembly. The control assembly is placed near the valve to be controlled and contains the electronics necessary to power the sensor assembly, select the desired moisture level, apply power to a valve if added moisture is required, and remove power from a valve when adequate moisture exists.

DESCRIPTION OF THE PREFERRED EMBODIMENT

Figure 1:
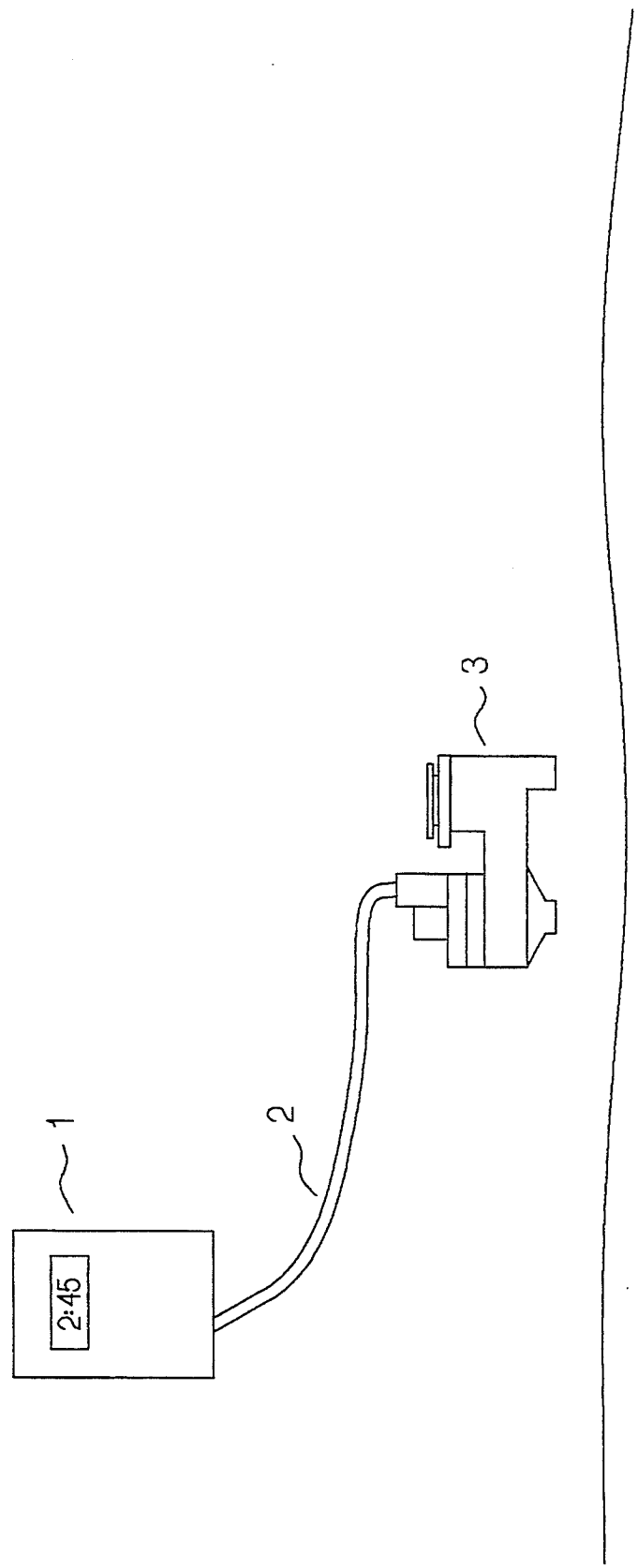
FIG. 1 is a schematic of a typical valve control.

Referring to FIG. 1, a typical valve control has a clocking device 1 which selects a valve 3 to be activated at a predetermined time and causes 24 VAC to be applied via two wires 2 to valve 3. This power is applied for an amount of time which was also predetermined. As long as the 24 VAC is applied, valve 3 will allow water to flow through attached water conduits (not shown).

Figure 2:
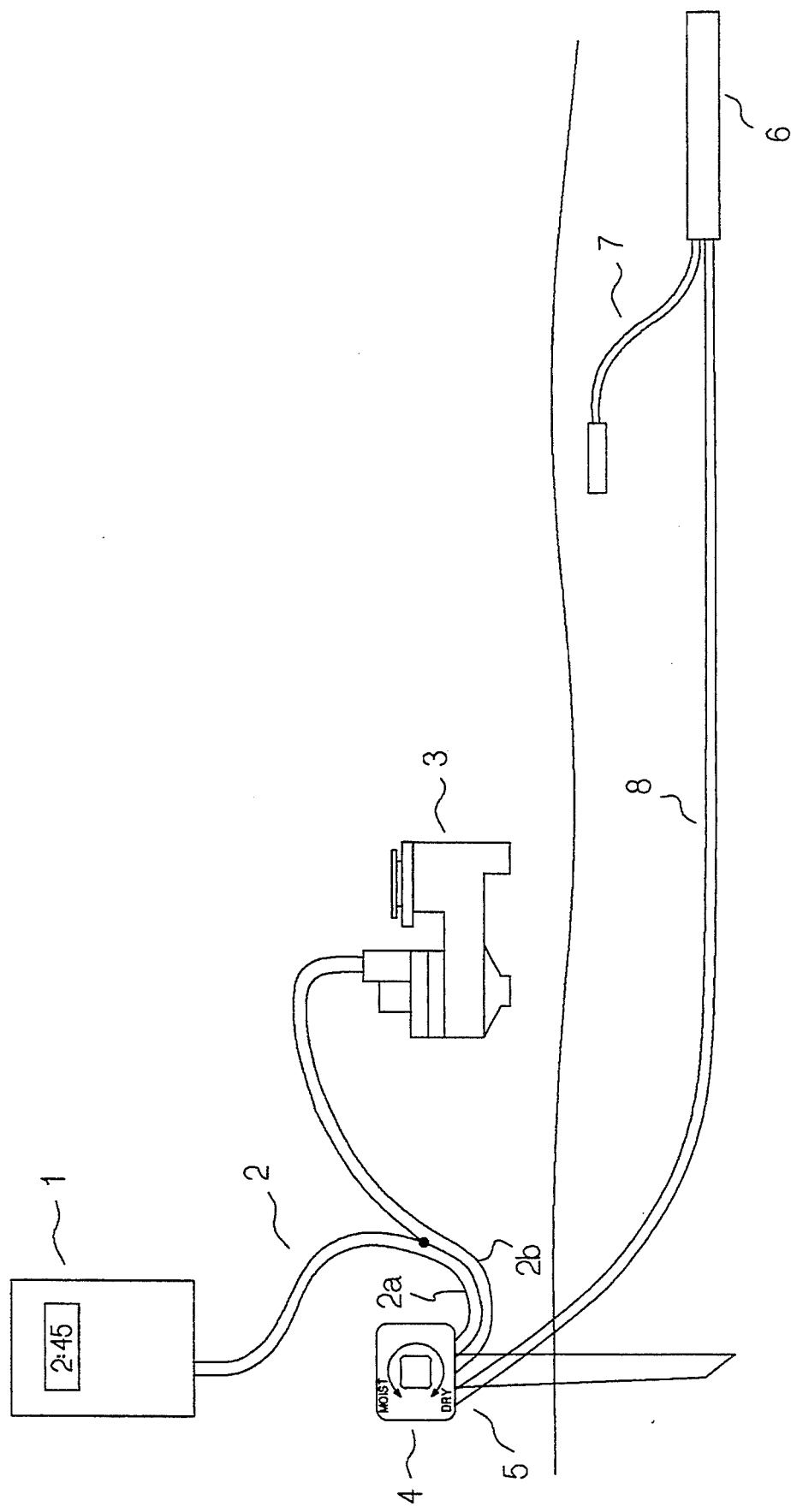
FIG. 2 is a schematic of FIG. 1 retrofitted by this invention.

Referring to FIG. 2, one 2a of the two wires 2 from clocking device 1 to valve 3 now connects to control 4. The wire 2b from valve 3 which previously connected to clocking device 1 now connects to controller 4. Controller 4 is connected to each of the two wires 2 from clocking device 1. When clocking device 1 applies power to the two wires 2 and the moisture content of the soil where remote detector 6 is disposed falls below the selected amount controller 4 will cause the wire 2B from the valve 3 which is now connected to controller 4 to be electrically reconnected to clocking device 1 via wire 2A. Input power and desired moisture level data for remote detector 6 is supplied by control 4 and moisture level data is supplied to controller 4 by remote detector 6 through wires 5. Typically wires 5 need to be extended in length by using wires 8. The sensing apparatus 7 has electrical characteristics such that its resistance changes with respect to surrounding moisture. The sensing apparatus 7, which can be as simple as two brass rods 0.125 in diameter and 1.5 inches long separated by 1.5 inches, or more complex, such as that disclosed in U.S. Pat. No. 4,952,868, is connected to and becomes part of the remote detector 6.

Figure 3:
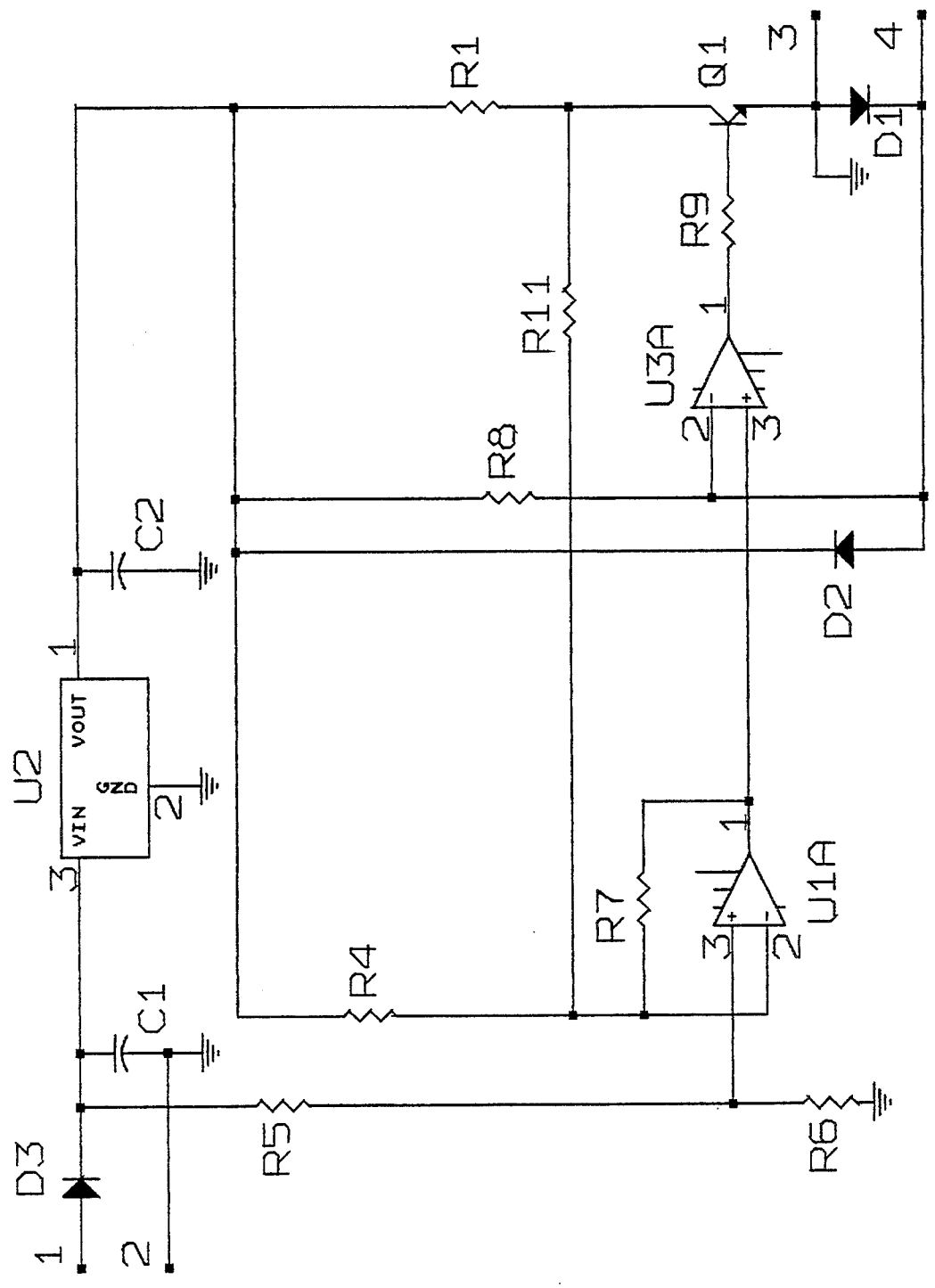
FIG. 3 is a schematic of the remote detector portion of this invention.

Referring to FIG. 3, the remote detector receives its power from the controller 4 on pins 1 and 2, 1 being positive. The voltage is adjustable at the controller to say 10 to 15 VDC and this value is used by the remote detector to determine the desired moisture level. Diode D3 prevents accidentally applied reverse voltage to pins 1 and 2 from damaging the remaining circuitry. The input power after passing D3 is filtered by capacitor C1 and is applied as input to voltage regulator U2 and through a voltage divider comprised of resistors R5 and R6 to the non inverting input of differential amplifier U1. The output of U2, fixed at say 5 VDC, is filtered by capacitor C2 and applied as input power for U1 and level detector U3. This voltage is also applied through a voltage divider comprised of resistor R8 and the sensing apparatus (7 of FIG. 2) connected to pins 3 and 4 to the inverting input of level detector U3. The sensing apparatus changes resistance as a function of moisture and therefore the voltage appearing at the inverting terminal is a function of moisture. In addition the output voltage of U2 is also applied through a resistor network comprised of R4, R1, and R11 to the inverting terminal of the differential amplifier U1. The values of resistors R5 and R6, R4, R1, and R11, and R7 are selected such that when the input voltage at pins 1 and 2 is varied through its limits the output of U1 will vary accordingly between say 0 VDC and 5 VDC. The value of R11 is very large when compared to the value of R4 such that it has a small effect on the voltage appearing at the output of U1. The purpose of R11 is to give the output of U1 a slightly different value when transistor Q1 conducts than when it does not. This difference gives the level detector U3 a hysteresis in its trip point reducing the effects of noise. The non inverting input terminal of U3 is connected to the output of U1 and is used as its reference voltage. The reference voltage can be caused to change as a function of ambient temperature of the remote detector by replacing resistor R4 with one whose resistance is a function of temperature causing the desired moisture level to be a function of remote detector temperature. The voltage at the inverting terminal of U3 is compared to the non inverting terminal and when it is less than the non inverting input the output of U3 is high causing Q1 to conduct. The value of resistor R1 is selected such that the current at the input pins, 1 and 2, increases by say 5 times when Q1 conducts. This increase in current is used by the controller circuit, FIG. 4, to determine that the desired moisture level has been reached and inhibit power to an irrigation control valve. A temperature sensitive switch can be placed across transistor Q1 to inhibit valve power at a predetermined ambient temperature of the remote detector.

Figure 4:
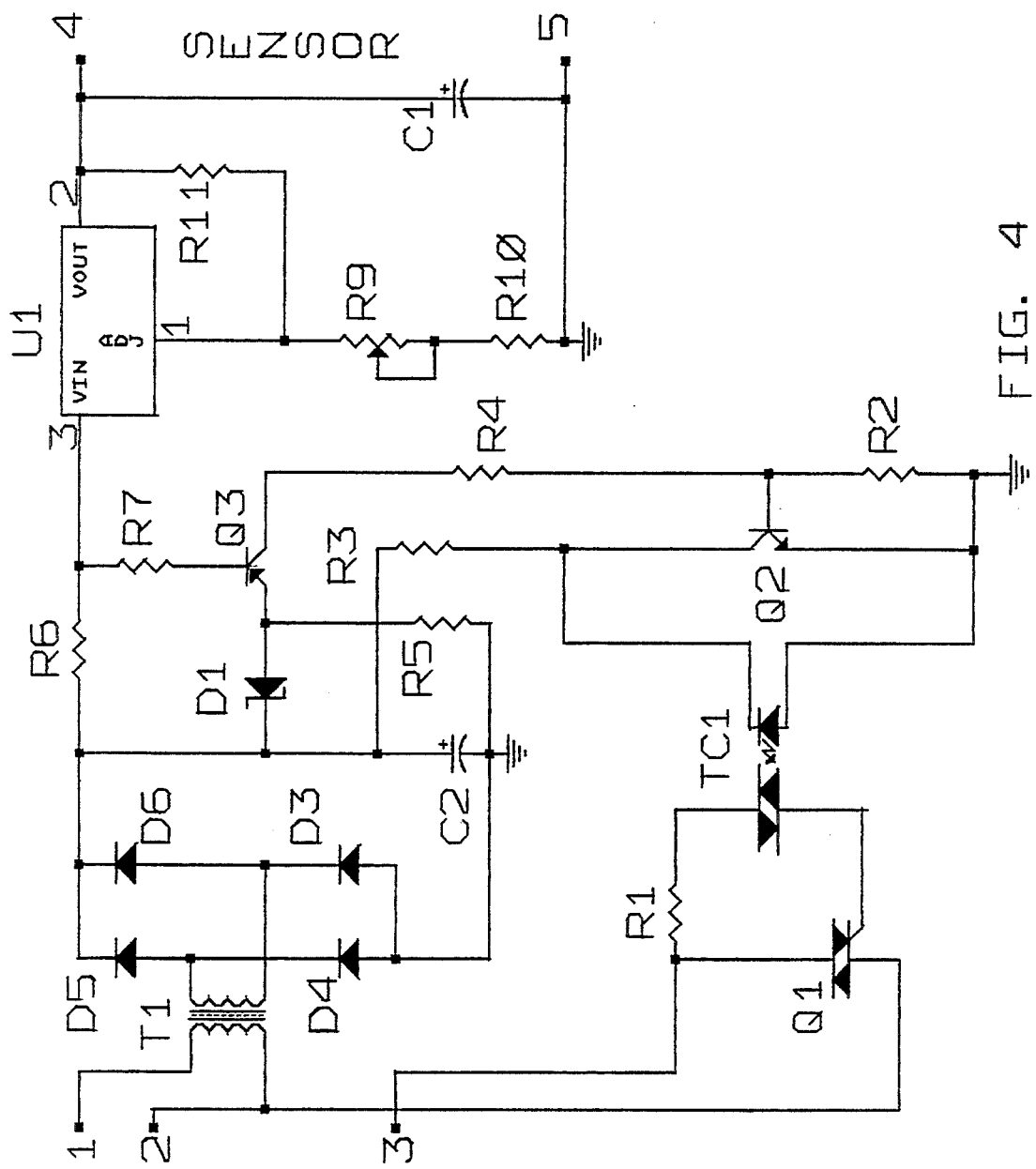
FIG. 4 is a schematic of the controller portion.

Referring to FIG. 4, the 24 VAC input power for the controller circuit is connected to pins 1 and 2 which are connected to isolation transformer T1. The isolated AC voltage of T1 is applied as an input to a bridge rectifier comprised of D3, D4, D5, and D6 which converts it to DC. The DC is filtered and supplied through resistor R6 as input power to the adjustable voltage regulator U1 and to the current detector circuits reference voltage diode D1. The current detector is comprised of resistors R2, R4, R6, R7, reference diode D1, and transistors Q2 and Q3. By comparing the voltage developed across R6, a function of the current required by U1, and the fixed voltage developed across diode D1, it is possible to detect when the remote detector circuit is in its high current condition, indicating that the moisture is at or above the selected value. When the voltage across R6 is greater than the voltage of D1 transistor Q3 will begin to conduct. When Q3 conducts, current will flow through resistor R4 causing transistor Q2 to conduct reducing the current into the optically coupled triac trigger TC1 to 0. Current flows through resistor R3 into TC1 or Q2. Current into TC1 will cause triac Q1 to conduct. Therefore when current is not detected and Q2 is off, triac Q1 will be caused to conduct. When current is detected and Q2 conducts, Q1 will cease conduction. An irrigation valve is connected to pins 1 and 3 such that when Q1 conducts the valve is energized and water will flow until the desired level of moisture is reached. A temperature sensitive switch can be placed across transistor Q2 to inhibit power to the valve at a predetermined ambient temperature of the controller. When the desired moisture level is reached, remote detector current demand will increase causing triac Q1 to cease conduction and de-energize the valve. Voltage regulator U1, resistors R9, R10 and R11, and capacitor C1 comprise the power source for the remote detector circuit which is connected to pins 4 and 5. Adjusting the value of R9 will cause the voltage on pins 4 and 5 to vary between say 10 and 15 VDC. The value of this voltage is used by the remote detector to determine the desired level of moisture. The desired moisture signal can be caused to vary as a function of the ambient temperature of the controller by replacing resistor R11 with one whose resistance is a function of temperature causing the desired moisture level to be a function of controller temperature.

I claim:

1. For a ground irrigation system including a water valve operated by periodic energization, a device for controlling the valve comprising:
    (a) a controller comprising:
        (1) means for selecting a moisture level threshold,
        (2) means for producing a first signal, the first signal corresponding to a selected moisture level threshold,
        (3) means for receiving a second signal, and
        (4) means, responsive to the second signal, for de-energizing the water valve;
    (b) a detector remotely spaced from the controller comprising:
        (1) sensor means for producing a third signal, the third signal corresponding to the moisture level of the ground,
        (2) means for receiving the first signal, and
        (3) means for comparing the first and third signals and for producing the second signal in response to the comparison showing a predetermined relationship between the first and third signals, and;
    (c) means for interconnecting the controller and detector to allow transfer therebetween of the first and second signals.

2. The device according claim 1 further comprising:
    (a) wire means for providing energization from the controller to the detector, and
    (b) means for communicating the first signal from the controller to the detector via said wire means.

3. The device according claim 1 further comprising:
    (a) wire means for providing energization from the controller to the detector, and (b) means for communicating the second signal from the detector to the controller via said wire means.

4. The device according claim 1 further comprising:
(a) wire means for providing energization from the controller to the detector,
(b) means for communicating the first signal from the controller to the detector via said wire means, and
(c) means for communicating the second signal from the detector to the controller via said wire means.

5. The device according to claim 1 wherein the first signal comprises a voltage the magnitude of which corresponds to the selected moisture level threshold.

6. The device according to claim 1 wherein:
(a) the detector further comprises:
 (1) a current load, and
 (2) means for actuating the current load in response to the moisture level of the ground being not less than the moisture level threshold;
(b) the second signal comprises an increase in the magnitude of current in the detector due to actuation of the current load; and
(c) the controller's means for receiving the second signal comprises means for sensing the current in the detector.

7. The device according to claim 1 further comprising:
(a) means for providing energization from the controller to the detector,
(b) means, in the controller, for setting, over a range, the level of energization provided by the controller to the detector according to the selected moisture level threshold, the level of energization being the first signal, and
(c) wherein the detector's means for receiving the first signal comprises means for sensing the level of energization.

8. The device according to claim 7 wherein the energization provided from the controller to the detector is electrical energy and wherein the first signal comprises the level of voltage of the electrical energy.

9. The device according claim 1 further comprising:
(a) means for providing energization from the controller to the detector, the detector being an energy load,
(b) means, in the detector communicating with the sensor means and the means for receiving the first signal, for increasing beyond a predetermined level the detector energy load in response to the moisture content of the ground being not less than the moisture level threshold, the increase in detector energy load being the second signal, and
(c) means, in the controller, for sensing the increase in the level of detector energy load.

10. The device according to claim 9 wherein the energization provided from the controller to the detector is electrical energy and wherein the second signal comprises an increase in current load.

11. The device according to claim 1 further comprising means for energizing the controller by drawing power from the periodic energization, and means for providing energization from the controller to the detector.

12. The device according to claim 11 further comprising means for setting the level of energization provided by the controller to the detector according to the selected moisture level threshold, the level of energization being the first signal.

13. The device according to claim 1 wherein the predetermined relationship comprises the magnitude of the third signal not being less than the magnitude of the first signal.

14. The device according to claim 1 wherein the means for comparing the first and third signals and for producing the second signal comprises:
(a) means for producing a reference signal corresponding to the first signal, and
(b) means for comparing the reference signal and the third signal and for producing the second signal in response to the comparison showing a predetermined relationship between the reference and third signals.

15. The device according to claim 14 wherein the predetermined relationship comprises the magnitude of the third signal not being less than the magnitude of the reference signal.

16. The device according to claim 14 further comprising means for modifying the reference signal as a function of the temperature ambient to the detector.

17. The device according to claim 14 further comprising means for modifying the first signal as a function of the temperature ambient to the controller.

18. The device according to claim 1 further comprising means for modifying the first signal as a function of the temperature ambient to the controller.

19. The device according to claim 1 further comprising means for inhibiting energization to the water valve in response to the controller being at or above a predetermined temperature.

20. The device according to claim 1 wherein the first signal comprises a voltage level, and wherein the means for producing the first signal comprises a voltage regulator the output of which is adjustable by the means for selecting a moisture level threshold.

* * * * *